July 9, 1935.  D. GILBERTSON  2,007,646
QUACK GRASS DESTROYER
Filed Nov. 5, 1934  3 Sheets-Sheet 1
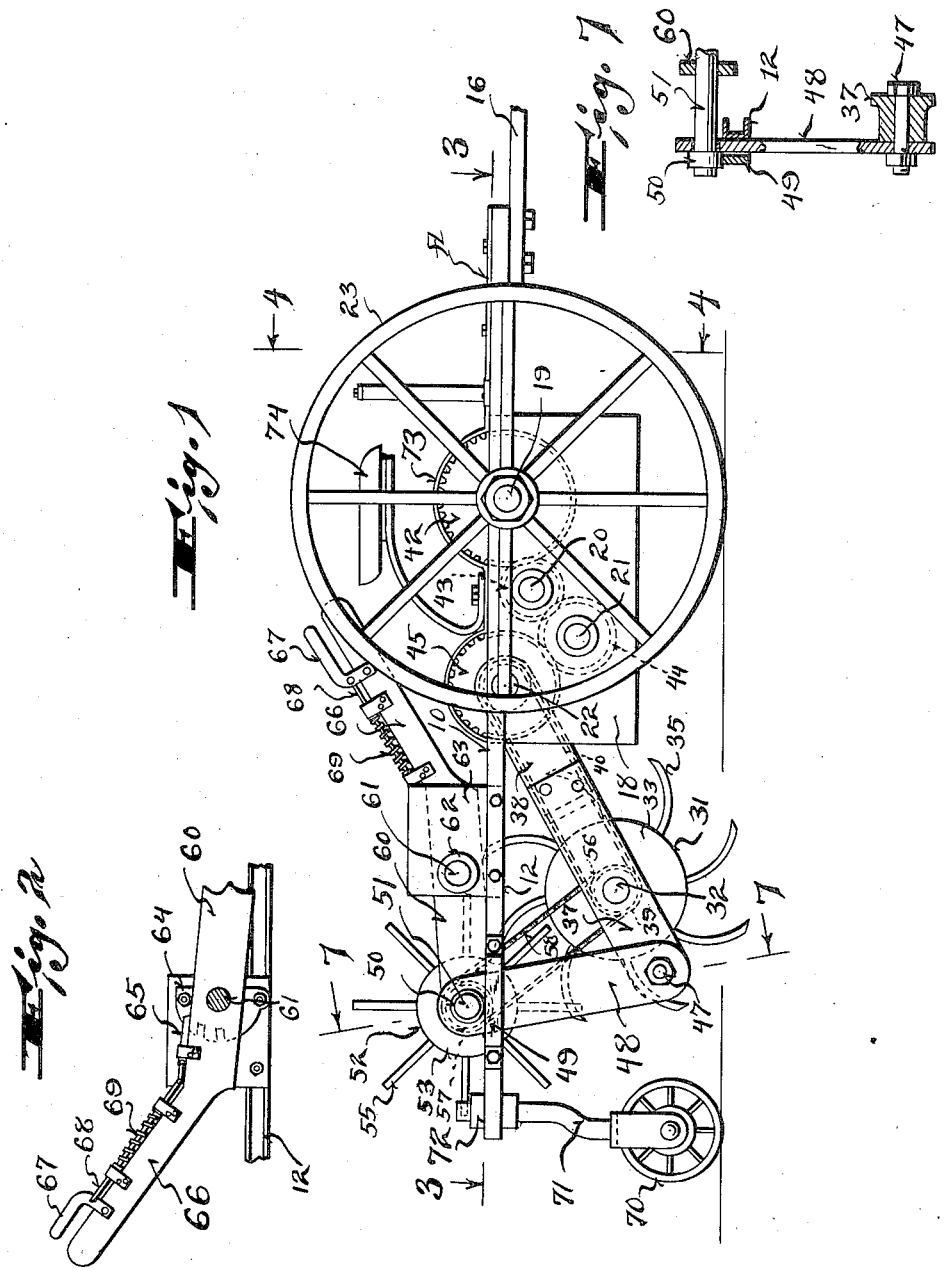
Inventor
D. Gilbertson
By Young & Young
Attorneys

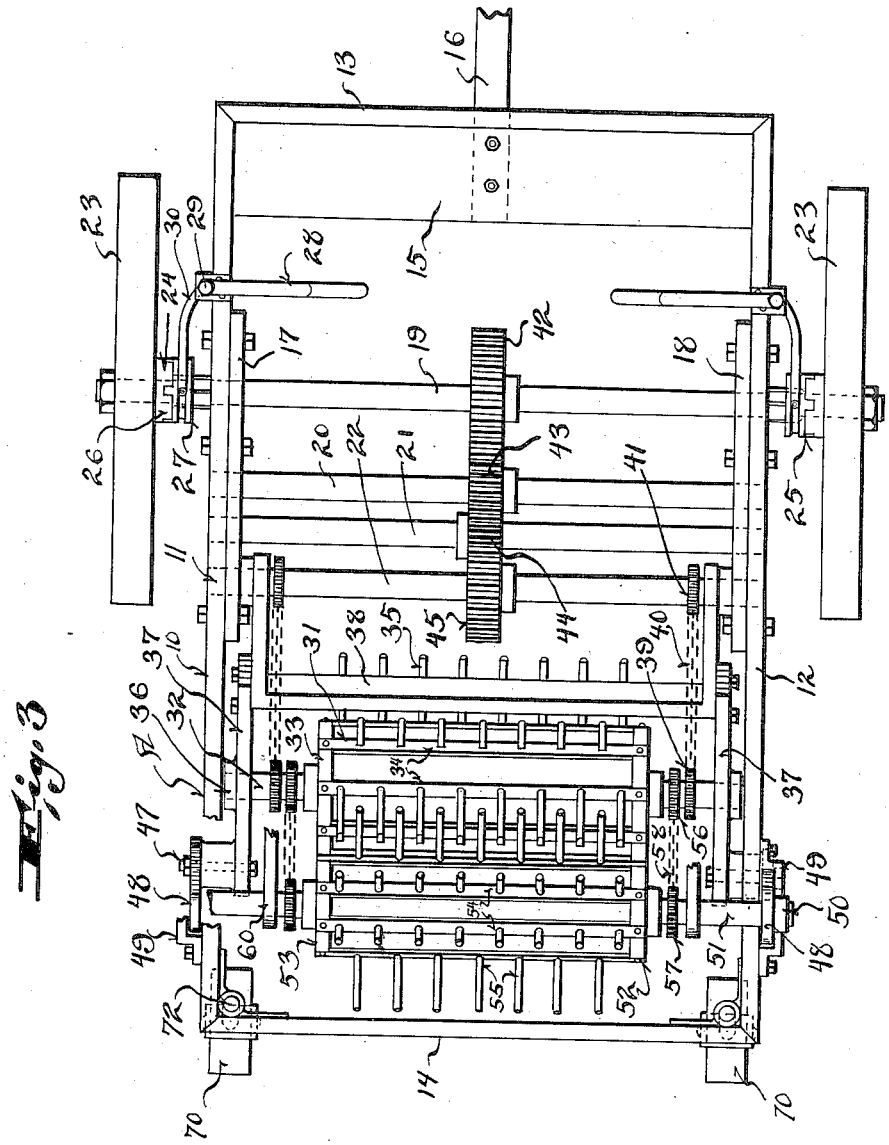

July 9, 1935. D. GILBERTSON 2,007,646
QUACK GRASS DESTROYER
Filed Nov. 5, 1934 3 Sheets-Sheet 3
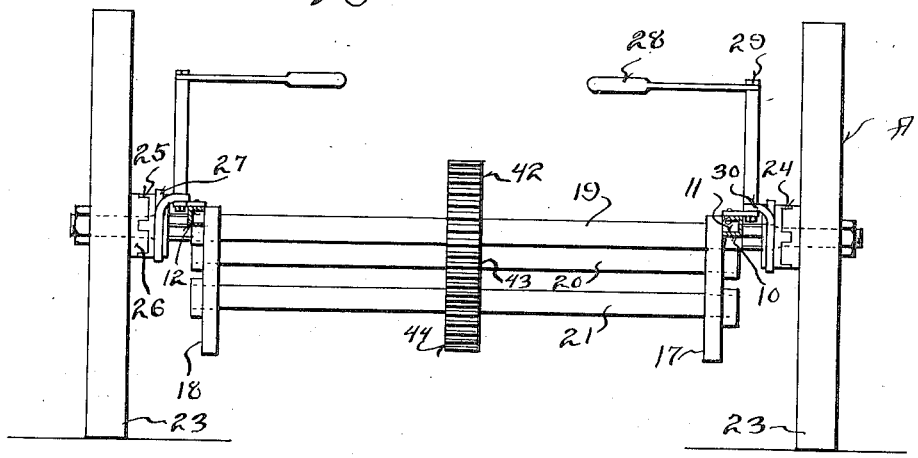
Fig. 4
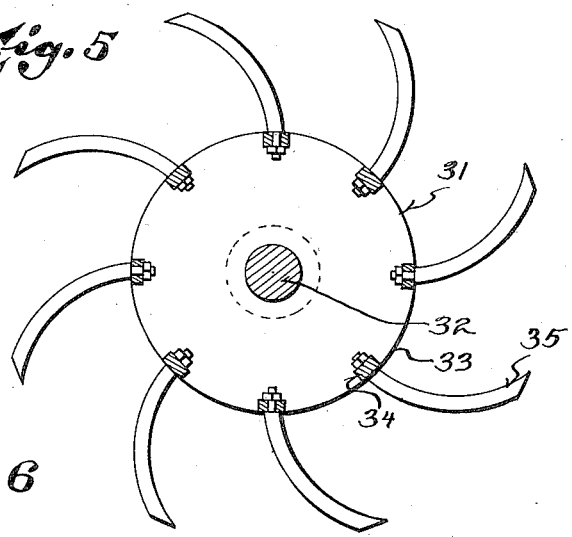
Fig. 5
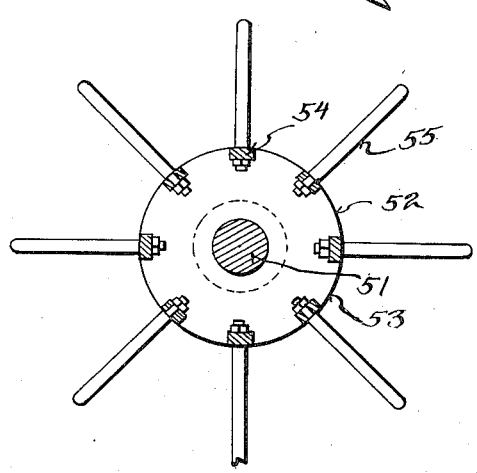
Fig. 6
Inventor
D. Gilbertson
By Young Young
Attorneys Patented July 9, 1935

2,007,646

UNITED STATES PATENT OFFICE 2,007,646

QUACK GRASS DESTROYER

Dena Gilbertson, Milwaukee, Wis.

Application November 5, 1934, Serial No. 751,561

2 Claims. (Cl. 97—10)

This invention appertains to agricultural implements and more particularly to a quack grass destroyer and the same is an improvement of my prior Patent No. 1,794,607, issued to me March 3, 1931.

One of the primary objects of my present invention is to generally improve the construction shown in said prior patent whereby the same will be more efficient in use and whereby the same can be manufactured and placed upon the market at a reasonable cost.

Another salient object of my invention is the provision of novel means for insuring the proper removal of the quack grass and other weeds from the digger so that the digger will be kept clear at all times and whereby the grass removed from the digger will be thrown clear of the machine and in back of the digger.

A further important object of my invention is the provision of novel means for operating the toothed drum or digger and the comb or clearer reel from the ground wheels or main axle of the machine, so that as the machine is drawn across a field, the digger or toothed drum and clearer reel will be properly actuated.

A further object of my invention is the provision of novel means for mounting the toothed drum or digger and clearer reel, whereby both of these parts can be simultaneously adjusted relative to the ground.

A still further object of my invention is the provision of means whereby either one of the ground wheels can be thrown out of driving engagement with the main axle independently of the other, so that the machine can be easily and readily turned around in the field and still permit the operation of the toothed drum and the clearer reel.

With these and other objects in view, the invention consists in the novel construction, arrangement and formation of parts, as will be hereinafter more specifically described, claimed and illustrated in the accompanying drawings, in which:

Figure 1 is a side elevation of my improved quack grass destroying machine.

Figure 2 is an enlarged fragmentary detail sectional view illustrating the mounting of the adjusting hand lever for the toothed drum and the clearer reel.

Figure 3 is a top plan view of my improved machine, parts of the same being shown broken away for the sake of clearness, said view being taken substantially on the line 3—3 of Figure 1 looking in the direction of the arrows.

Figure 4 is a transverse sectional view through the machine taken substantially on the line 4—4 of Figure 1 looking in the direction of the arrows.

Figure 5 is an enlarged detail transverse sectional view through the digger or toothed drum.

Figure 6 is an enlarged transverse sectional view through the comb wheel or clearer reel.

Figure 7 is a fragmentary detail sectional view taken on the line 7—7 of Figure 1 looking in the direction of the arrows.

Referring to the drawings in detail, wherein similar reference characters designate the corresponding parts throughout the several views, the letter A generally indicates my improved quack grass destroyer, which comprises a main frame 10. This frame 10 can comprise longitudinally extending spaced parallel side bars 11 and 12 and front and rear end bars 13 and 14. The bars 11, 12, 13 and 14 are preferably, but not necessarily, formed of channel beams and this frame can be braced in any desired manner. As shown, the front end of the frame is provided with a cross plate 15 which can be connected to the front end bar 13 and the side bars 11 and 12. This plate 15 and the front end bar 13 can constitute means for supporting the draft rigging 16. This rigging 16 can be of any desired character so that my improved machine can be drawn by a tractor or by draft animals.

Depending from the opposite sides of the frame 10 are bracket plates 17 and 18 and these plates are bolted or otherwise secured to the side channel beams 11 and 12. The bracket plates and the side bars 11 and 12 form means for rotatably supporting the main drive axle 19 and cross shafts 20, 21 and 22. The axle 19 has rotatably mounted on its ends ground or bull wheels 23 and these wheels can be provided with any desired type of cleats, if so preferred.

Novel means is provided for independently connecting the wheels with the axle 19 and suitable clutches 24 and 25 are provided for this purpose. Each of these clutches is constructed the same and includes a clutch section 26 rigidly connected with its wheel and a sliding clutch section 27 feathered on the axle. An independent operating lever 28 is provided for each clutch and each lever is secured to a vertical shaft 29 rotatably supported on the main frame. A crank arm 30 is secured to each vertical shaft and these crank arms are provided with shifter yokes for engaging the sliding clutch sections of the clutches 24 and 25. By this construction, it can be seen that either one or both of the wheels 23 can be connected with the axle 19.

In rear of the axle 19 and the cross shafts 20, 21 and 22, I mount the digger or toothed drum 31. This toothed drum extends transversely across the machine and embodies a main supporting shaft 32 to which is rigidly connected end discs 33. The end discs 33 have rigidly connected thereto cross slats or supporting bars 34. Arcuate teeth 35 are detachably connected to said slats or cross bars 34 and these teeth are preferably arranged in staggered relation. The ends of the axle 32 are rotatably carried within suitable bearings 36 carried by supporting arms 37. The upper ends of these arms 37 are rigidly bolted or otherwise secured to a U-shaped frame piece 38, the legs of which are mounted for swinging movement on the rear cross shaft 22. Keyed or otherwise secured to the axle 32 are sprocket wheels 39 and these sprocket wheels 39 have trained thereabout sprocket chains 40. The sprocket chains 40 lead toward the front end of the machine and are trained over sprocket wheels 41 keyed or otherwise secured to the rear cross shaft 22. A train of gearing is employed for connecting the main or drive axle 19 with the rear cross shaft 22 and as shown, this train of gearing comprises intermeshing spur gears 42, 43, 44 and 45 which are keyed respectively to the axle 19 and cross shafts 20, 21 and 22. These gears are of the desired size, so that the toothed drum will be driven at the correct rate of speed during the travel of my machine over a field.

Pivotally connected to the ends of the supporting arms 37 by means of bolts 47 are adjusting arms or plates 48. These plates extend upwardly and are slidably supported by guide brackets 49 secured to the side channel bars 11 and 12. The extreme upper ends of the adjusting arms or plates 48 are provided with bearings 50 which rotatably support a driven shaft 51. This driven shaft 51 supports the comb or clearer reel 52. The reel 52 comprises end discs 53 connected together by cross straps or slats 54 to which are bolted the radially extending teeth 55. These teeth 55 are also staggeredly arranged relative to one another and are so disposed as to extend between the teeth 35 of the toothed drum 31. The driven shaft 51 is operated in conjunction with the digger or toothed drum and consequently, the axle or shaft 32 is provided with sprocket wheels 56 which are in longitudinal alinement with sprocket wheels 57 keyed to the driven shaft 51. Sprocket chains 58 are trained over said pairs of sprocket wheels 56 and 57.

In order to bring about the raising and lowering of the toothed drum 31 and reel 52, I provide an adjusting lever 60 which can be of a substantially bell-crank shape. The forward end of the lever 60 rotatably supports the driven shaft 51 and this lever is rockably mounted intermediate its ends on a stub shaft 61. This stub shaft 61 is rotatably mounted in suitable bearings 62 carried by a bracket 63 bolted or otherwise secured to one of the longitudinal frame bars. Rigidly connected with the bracket 63 is a segmental rack bar 64, the teeth of which are adapted to be engaged by a dog 65 for holding the lever 60 against movement and the toothed drum and reel 52 in an adjusting position.

The handle end 66 of the lever 60 carries a pivoted hand grip 67 which is connected by means of a link 68 with the dog 65. A spring 69 is employed for normally holding the dog in engagement with the rack. Obviously, by releasing the dog and swinging the lever 60 in the desired direction, adjustment of the toothed drum can be had.

The rear end of the frame can be supported in any desired manner and I preferably provide caster wheels 70 for this purpose. The supporting arms 71 for the caster wheels can be rotatably mounted in bearings 72 supported by the rear end of the frame.

If desired, a guard plate 73 can be utilized for partially housing the train of gears employed for operating the cross shaft 22. Likewise a seat 74 for the operator can be secured to the frame. This seat is preferably disposed adjacent to the handle end 66 of the lever 60, so that this lever can be easily manipulated. Likewise the levers 28 for the clutches 24 and 25 terminate adjacent to this seat.

From the foregoing description, it can be seen that I have provided an improved device for removing quack grass from fields, which will be easy to manipulate and which will effectively accomplish its purpose.

Changes in details may be made without departing from the spirit or the scope of this invention, but what I claim as new is:

1. A quack grass destroyer comprising a main frame, a supporting axle, ground wheels rotatably mounted on the ends of the axle, a series of cross shafts supported by the main frame, means operatively connecting the cross shafts to the axle including a train of gearing, a supplemental frame rockably mounted on one of said cross shafts, a toothed digger drum rotatably mounted on the supplemental frame, means for rotating said toothed drum from one of the cross shafts, pivoted side arms secured to the supplemental frame, guide brackets slidably receiving said side arms, a clearer comb reel rotatably supported by the side arms, means for rotating said reel from the drum, an operating lever rockably mounted intermediate its ends, a bearing on the forward end of said lever rotatably receiving the shaft of the reel, a handle on said lever, and means for detachably latching the lever in an adjusted position.

2. A quack grass destroyer comprising a main frame, an axle and ground wheels for the main frame, a supplemental frame rockably mounted on the main frame and depending therefrom, a toothed digger drum rotatably mounted on the supplemental frame, means for rotating said drum, upwardly extending arms pivotally connected to the lower end of the supplemental frame, means on the main frame slidably receiving said arms, a clearer comb reel rotatably supported by said arms, means operatively connecting the reel with the drum, an adjusting lever rockably mounted on the main frame rotatably receiving the shaft of the reel, and means releasably holding the lever in an adjusted position.

DENA GILBERTSON.